United States Patent [19]

Skelton

[11] 4,044,955
[45] Aug. 30, 1977

[54] RECOVERY OF ALUMINUM FROM ALUMINUM-GLASS CLOTH RESIDUES

[76] Inventor: John P. Skelton, 101-515 Francois, Montreal, Quebec, Canada

[21] Appl. No.: 731,676

[22] Filed: Oct. 12, 1976

[51] Int. Cl.² ............................................. B02C 19/12
[52] U.S. Cl. ....................................... 241/14; 241/24; 241/29
[58] Field of Search ..................... 241/3, 14, 24, 27, 29

[56] References Cited

U.S. PATENT DOCUMENTS

| | | | |
|---|---|---|---|
| 2,509,147 | 5/1950 | Hurst | 241/14 |
| 2,509,148 | 5/1950 | Hurst | 241/14 |
| 3,705,694 | 12/1972 | Slocum | 241/14 |
| 3,894,693 | 7/1975 | Takashima | 241/14 |

Primary Examiner—Granville Y. Custer, Jr.

[57] ABSTRACT

A method is described for reclaiming aluminum from aluminum-glass cloth residues in which the glass cloth fibers are coated with aluminum, the glass cloths having been used for the filtering of molten aluminum. The method comprises the steps of: breaking down the residue into small pieces, squeezing each piece of residue between hard surfaces on a pair of rotating cylindrical rolls with sufficient squeezing pressure to extrude the aluminum coating to destroy its integrity and expose the interior glass fibers along substantially the entire length of each piece and segregating the resulting glass fibers from the remaining aluminum pieces by air separation. The recovered aluminum pieces can be then reused in various industrial processes.

6 Claims, 4 Drawing Figures

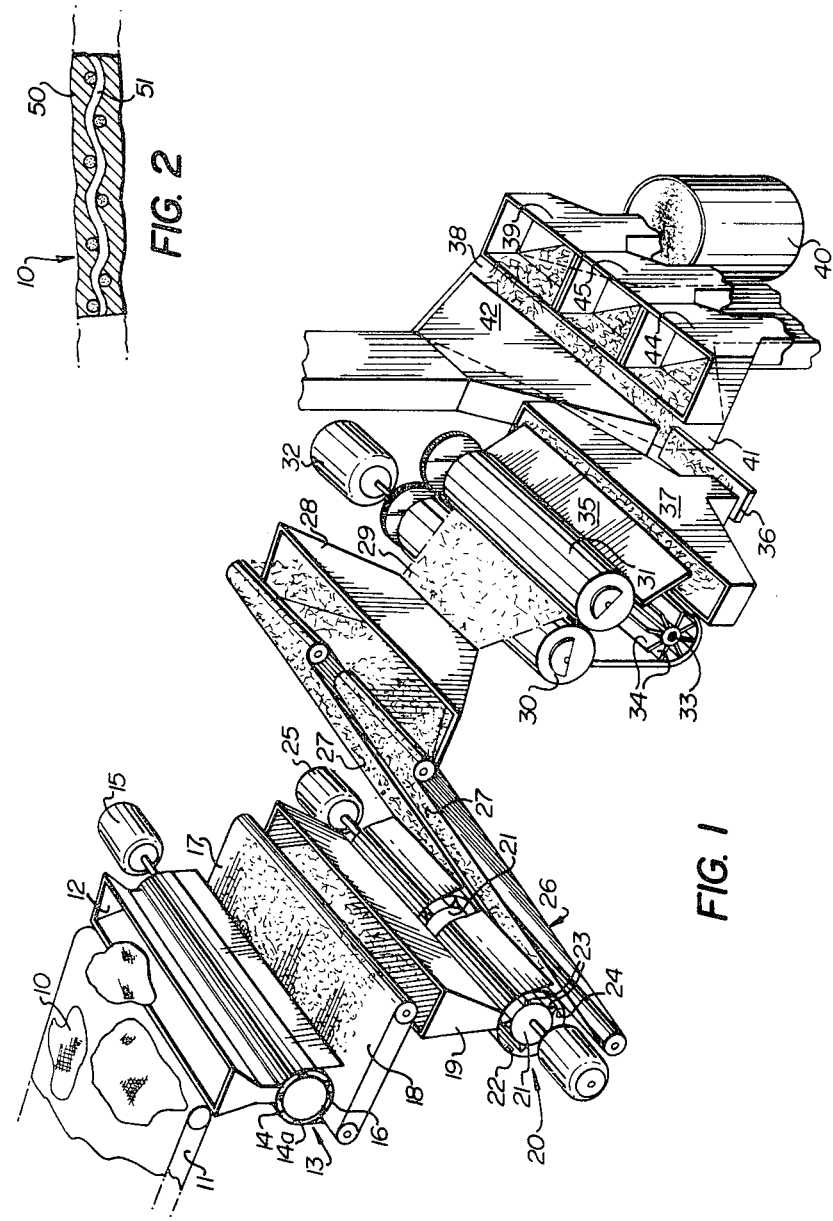

RECOVERY OF ALUMINUM FROM ALUMINUM-GLASS CLOTH RESIDUES

BACKGROUND OF THE INVENTION

This invention relates to a method of reclaiming aluminum from aluminum-glass cloth residues.

In pouring molten aluminum into various solid shapes suitable for rolling or extrusion operations, the molten aluminum passes through a woven glass cloth filter. The purposes of this filtering is to minimize the number of hard particles e.g. aluminum borides and aluminum oxides, contained in the molten metal from entering the solid shape. Such a procedure using a glass cloth filter is described in Canadian Pat. No. 554,853 issued Mar. 25, 1958.

This filtering technique is widely used throughout the aluminum industry and a significant amount of metal freezes on the glass cloth on completion of each pour of molten aluminum. The usual method for recovering the aluminum deposited on the glass cloth is by differential melting whereby the glass cloth with the deposited aluminum is heated to a temperature at which the aluminum melts but below the point at which the glass cloth melts. This combined with differences in specific gravity results in their separation, the glass cloth rising to the surface of the bath to be skimmed off as part of the "dross." This has been done either by returning the aluminum-glass cloth residues to the melting furnace from which the aluminum has passed through the glass cloths or it is even sometimes done in totally different locations.

SUMMARY OF THE INVENTION

It has now been very surprisingly found that the aluminum and glass cloth can be quite easily separated by means of a mechanical technique. Thus, according to the method of this invention glass cloth filters having a coating of solidified aluminum hereon are broken down into small pieces and each piece of residue is then squeezed between hard surfaces on a pair of rotating cylindrical rolls with sufficient squeezing pressure to extrude the aluminum coating to destroy its integrity and expose the interior glass fibers along substantially the entire length of each piece. The resulting glass fibers are segregated from the remaining aluminum pieces by means of air separation.

A device of the general type used for reclaiming the aluminum from the aluminum-glass cloth residues according to this invention has in general form been used for other purposes, e.g. stripping plastic insulation from aluminum or copper wires and cables. Such an apparatus is described, for instance, in U.S. Pat. No. 3,705,694, issued Dec. 12, 1972.

Unlike the situation where plastic insulation has been removed from aluminum or copper cores, in the present case the used glass cloth filter is of relatively weak or brittle material which is surrounded by a relatively stronger or ductile body of aluminum with the individual fibers of the glass cloth being locked in by metal which has solidified in the openings through the filter. Thus, the useless material is located inside the desirable material. This is the direct opposite of the situation with the scrap wires where the weaker material, i.e. the plastic insulation, surrounds the stronger malleable material, e.g. the aluminum or copper. In attempting to utilize the apparatus described in U.S. pat. No. 3,705,694 for segregating glass cloth fibers and aluminum it had been expected that the malleable aluminum outer casing around the fibers would simply deform and continue to act as an envelope surrounding the brittle glass cloth fibers. However, for reasons which are not yet fully understood the interior fiber pieces appear to be sufficiently freed from the metal as a result of the crushing operation that they can be separated by air separation, preferably by suction.

Certain preferred features of the invention are described in the following detailed description taken in connection with the accompanying drawings in which:

FIG. 1 is a diagrammatic view of an apparatus for carrying out the method of this invention;

FIG. 2 is an enlarged view of a piece of used aluminum-glass cloth filter prior to squeezing;

Figure 3:
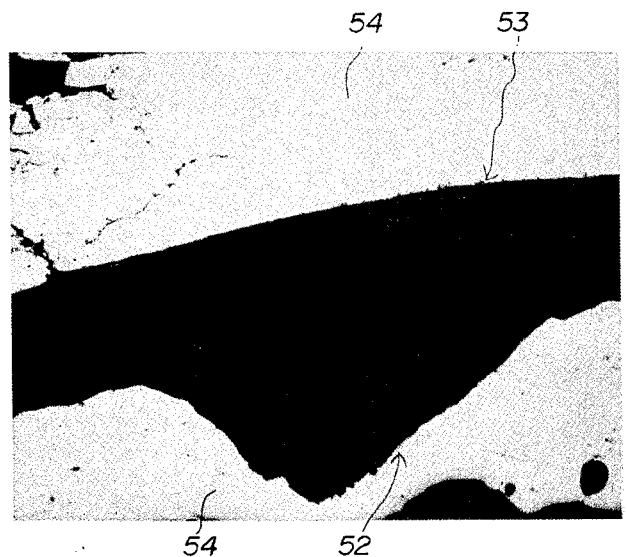
FIG. 3 is a microphotograph of an actual sample of a glass cloth filter coated with aluminum prior to squeezing; and, FIG. 4 shows a microphotograph of a aluminum chip obtained after segregation according to this invention.

As shown in FIG. 1, used glass cloth filters 10 coated with aluminum are carried along by conveyor 11 and dumped into a hopper 12 from which they are delivered to a chopping station 13. This chopping station includes a rotating drum 14 having bar-shaped cutters 14a rotatable past a fixed bed blade or block to chop the filters into pieces. The drum 14 is driven by means of a motor 15.

Surrounding the drum is a screen 16 in the form of a plate having holes of about 1 inch dimension through which broken down pieces of the glass fiber filter pass. Thus, the glass fiber filter pieces will be carried around by the blades 14a and recut, perhaps many times, until they are small enough to pass through the holes in the screen 16.

The pieces 17 that pass through the holes are conveyed by conveyor 18 into hopper 19. From this they are delivered into a second chopping station 20 where they are broken down into still smaller pieces. Each cutting station 20 includes a drum 21 with cutting blades 23 passing a fixed bed blade 22 and driven by motor 25. Once again, the cutter is surrounded by the screen 24 having openings of a size of about ⅜ inch. Thus, the pieces of aluminum-glass cloth residue are chopped within the chopping station 20 until they are small enough to pass through the holes in screen 24 and are delivered onto conveyor 25 as small pieces 27.

The small aluminum-glass fiber residue pieces 27 are delivered into hopper 28 and onto a flow spreader 29 in the form of a fluted sheet so as to cause the pieces 27 to fall relatively uniformly over a wide area. These pieces then fall between a pair of hard rolls 30 and 31 having hard, relatively unyielding surfaces.

The squeeze rolls 30 and 31 are preferably formed of hardened steel and have sufficiently large diameters as to provide surfaces which will frictionally grip the aluminum-glass fiber pieces and carry them into and through the nip whilst squeezing the aluminum surrounding the glass cloth fibers. The rolls 30 and 31 are driven by an electric motor 32 and can conveniently be rotated at a speed of about 200 rpm.

Emerging from the bottom of rolls 30, 31 are pieces of aluminum metal and shredded pieces of glass cloth fibers. In order to approach 100% efficiency, leaving practically no glass cloth fragments on the aluminum pieces, the squeezed pieces are preferably rapped sharply to knock apart any pieces that may be stuck together after squeezing. This can be done by a rotating paddle wheel 33 having blades 34 which strike the pieces sharply knocking them against plate 35.

The aluminum pieces and the glass cloth pieces free from one another, are received by hopper 37 and thence carried by a vibratory metering conveyor 36 to segregating station in the form of a conventional segregator where the pieces are segregated by blowing, sucking and vibrating. This can take the form of a vibrating screen 38 inclined upwardly in the direction of flow and transversely of flow. It is vibrated in the direction of flow, causing the denser pieces of metal to move preferentially upward along the screen until they are discharged at the end through chute 39 into receptacle 40. The lighter pieces of glass cloth fibers are preferentially levitated by a blast of air from a conduit 41 below the table and are sucked away through a conduit 42 above the table.

In the event that there are some aluminum pieces with some glass cloth fibers still adhering thereto, these can also be separated on the vibrating screen 38 via intermediate chutes 44 and 45.

A schematic illustration of a piece of used glass cloth filter prior to squeezing is shown in FIG. 2 with the aluminum 50 surrounding the glass cloth 51. A very small section of an actual piece of used glass cloth filter is shown in the microphotograph of FIG. 3 at a magnification of 100. In this microphotograph the glass fibers can be seen in both longitudinal and transverse section as grey dots 52 and lines 53 surrounded by the aluminum metal 54.

Figure 4:
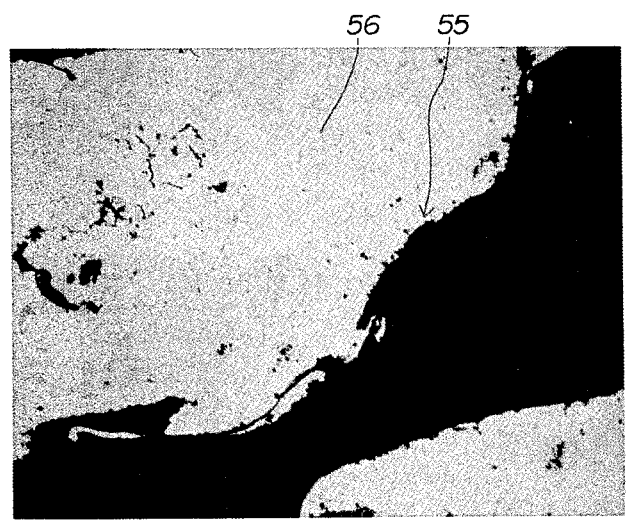

Looking next at FIG. 4, there is illustrated a microphotograph of an aluminum chip after separation and only minute amounts of remaining glass cloth fibers 55 can be seen on the surface of the aluminum chip 56.

While the above detailed description shows a preferred apparatus for carrying out the process of this invention, it will be readily appreciated that a number of modifications and simplifications of the process are quite feasible within the scope of the invention. Thus, while two chopping stations have been used to break the used filters down into small pieces, it is also possible to do this on a single chopping device. Moreover, it is not essential to knock the aluminum chips after squeezing in order to obtain a quite excellent separation. Finally, it is also possible to segregate the separated glass fibers and aluminum chips simply by means of overhead suction without the necessity of a full segregating screen.

I claim:

1. A method of reclaiming aluminum from aluminum-glass cloth residues in which the glass cloth is coated with aluminum comprising the steps of: breaking down said residue into small pieces, squeezing each piece of residue between hard surfaces on a pair of rotating cylindrical rolls with sufficient squeezing pressure to extrude the aluminum coating to destroy its integrity and expose the interior glass fibers along substantially the entire length of each piece and segregating the resulting glass fibers from the remaining aluminum pieces.

2. A method according to claim 1 wherein the glass fiber pieces are lifted from said aluminum pieces by a pressure differential.

3. A method according to claim 2 wherein the product of squeezing is mechanically rapped to assist in detaching glass fiber pieces from their associated aluminum pieces.

4. A method according to claim 3 wherein the aluminum-glass cloth residues are broken into small pieces by means of a rotary chopper.

5. A method according to claim 4 wherein the aluminum-glass cloth residues are broken into small pieces by passing through two rotary choppers in sequence.

6. A method according to claim 4 including the steps of using an air vibrating table to further segregate aluminum pieces and glass fiber pieces.

* * * * *